April 26, 1949.  F. J. EISELE  2,468,325
QUICK-ADJUSTABLE POSITIONING DEVICE
Filed Nov. 21, 1947  2 Sheets-Sheet 1

Frank J. Eisele
Inventor
Haynes and Koenig
Attorneys

April 26, 1949.  F. J. EISELE  2,468,325
QUICK-ADJUSTABLE POSITIONING DEVICE
Filed Nov. 21, 1947  2 Sheets-Sheet 2

Frank J. Eisele,
Inventor.
Haynes and Koenig,
Attorneys.

Patented Apr. 26, 1949

2,468,325

UNITED STATES PATENT OFFICE 2,468,325

QUICK-ADJUSTABLE POSITIONING DEVICE

Frank J. Eisele, St. Louis, Mo.

Application November 21, 1947, Serial No. 787,592

14 Claims. (Cl. 82—34)

This invention relates to quick adjustable positioning devices, and more particularly to such devices for use on machine tools, such as lathes, for accurate setting of tools or the work at different desired positions in such machines.

Among the several objects of the invention may be noted the provision of a quick-adjustable positioning device, particularly for use on lathes or other machine tools, embodying a positioning member or stop which may quickly be adjusted to different, accurately indexed positions; the provision of a positioning device of the class described wherein the stop is quickly adjustable through a selected standard index distance or through selected whole multiples or fractions of the index distance; the provision of a positioning device of this class wherein provision is made for fine adjustments of the stop without corresponding mechanical fineness being required of the stop elements, whereby the device may be made of rugged construction and easily used. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims:

In the accompanying drawings, in which one of the various possible embodiments of the invention is illustrated, Fig. 1 is a plan view of a positioning device of this invention;

Similar reference characters indicate corresponding parts throughout the several views of the drawings.

Figure 1:
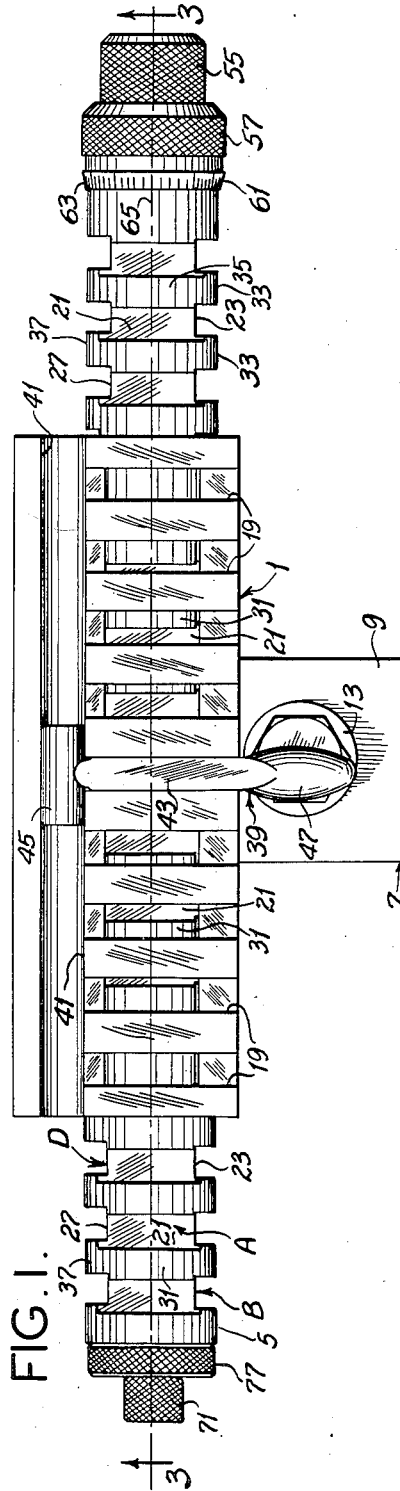
Figure 2:
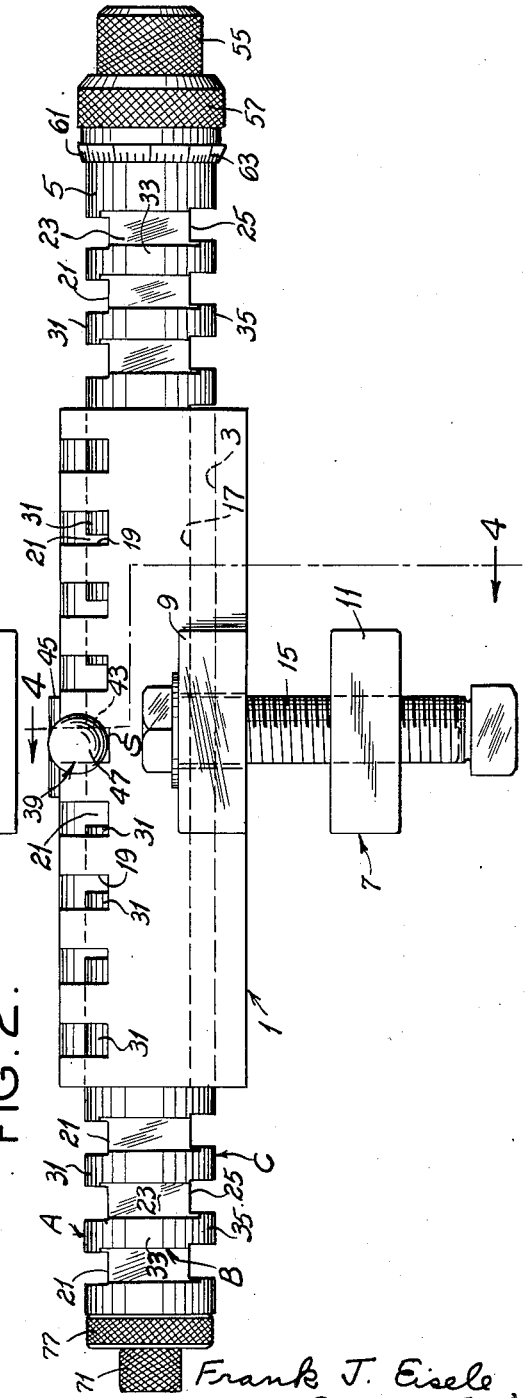
Fig. 2 is a front elevation of Fig. 1.
Figure 3:
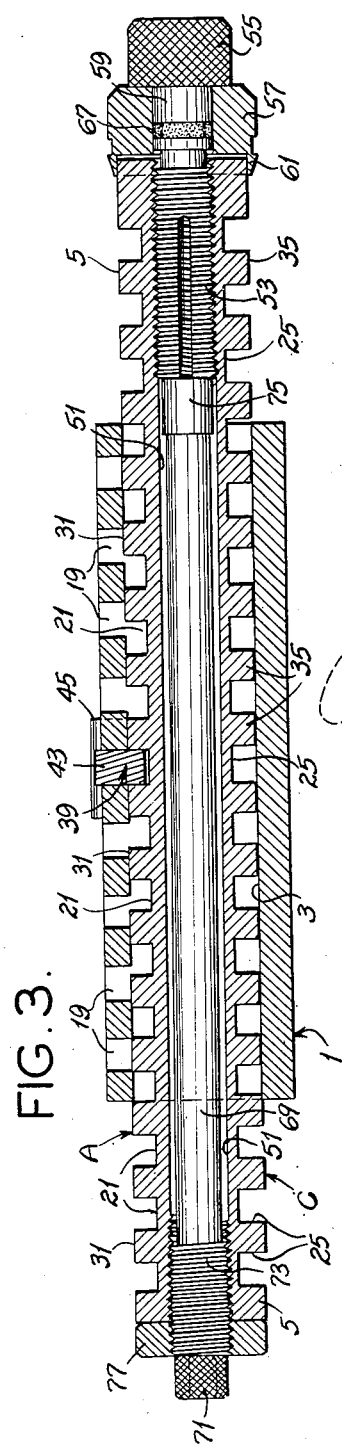
Fig. 3 is a vertical longitudinal section taken on line 3—3 of Fig. 1.

The quick-adjustable positioning device of this invention is particularly adapted for use on a lathe for facilitating the positioning of the tool carriage of the lathe at different indexed settings. The device embodies a positioning member or stop which is quickly adjustable to different indexed positions longitudinally of the bed of the lathe for engagement by the tool carriage so that the carriage may be accurately positioned at a desired setting simply by moving it until it engages the stop. This permits the carriage to be shifted between cutting or other operations with great rapidity and accuracy without excessively close attention on the part of the operator. While the invention is described particularly in reference to its use as a lathe stop, many analogous uses will be readily apparent.

Referring to the drawings, an embodiment of the positioning device of this invention for use as a lathe stop is shown to comprise an elongate guide block 1, of generally rectangular cross section, having a bore 3 forming a cylindrical bearing aperture extending completely through the block from one of its ends to the other. This guide block functions as a fixed reference member in respect to an elongate cylindrical positioning member or stop bar 5 which is rotatable and longitudinally slidable in the aperture 3.

Figure 4:
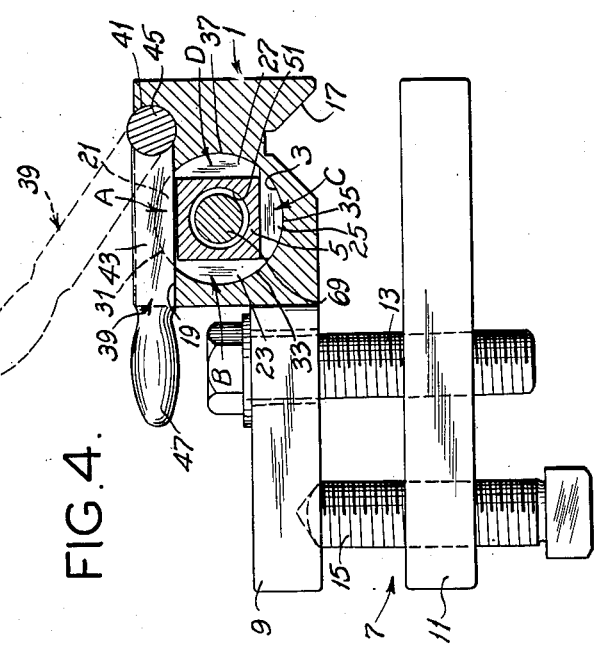
Fig. 4 is a vertical transverse section taken on line 4—4 of Fig. 2.

The block 1 is provided with suitable means for fixing it in position on a lathe bed, such as the clamp designated 7. The clamp comprises a fixed jaw 9 extending from one side of the block and a movable jaw 11 coupled to the fixed jaw by clamp screws 13 and 15. The movable jaw extends beneath the guide block. The latter has a longitudinal V-shaped groove 17 (Fig. 4), milled in its bottom to receive one of the V-shaped ways of a conventional lathe (not shown) when the block is clamped on and above the way.

The guide block 1 has a longitudinal row of slots 19 extending transversely through its uppermost wall from one of its sides toward its opposite side. These slots are spaced at equal intervals along the length of the block and are of equal width. The slots are cut completely through the uppermost wall of the block so as to form apertures through this wall leading into the bore 3.

The stop bar 5 is considerably longer than the guide block 1 so as to project a substantial distance out of the bore 3. It is formed with four longitudinal rows of recesses or notches, the rows being designated A, B, C and D, spaced at 90° intervals around its periphery. Each row constitutes a rack, the notches of each row being between adjacent teeth of the respective rack. The notches of the rows A, B, C and D are respectively designated 21, 23, 25 and 27. The teeth of the rows A, B, C and D are respectively designated 31, 33, 35 and 37. The notches (and the teeth) of each of the four rows or racks A, B, C and D have the same pitch. The widths of the notches of the four rows or racks are equal to the widths of the slots 19. The pitch of the racks, however, differs from the pitch of the slots 19 by a selected index distance.

The stop bar 5 is rotatable in the guide block 1 selectively to align one of the racks A, B, C and D uppermost with the row of slots 19. It is slidable in the block to align a selected notch in a selected rack with a selected slot 19, whereupon a latch or dog 39 may drop into the selected slot and notch to latch the stop bar in adjusted position.

The notches (and teeth) of each one of the four racks are longitudinally staggered or axially displaced from the notches (and teeth) of the two adjacent racks by an increment corresponding to a fraction of the index distance, in order to provide for adjustments of the stop bar through fractions of the index distance. Four racks are herein provided to permit adjustments of the stop bar through increments equal to one-fourth of the index distance. Rack B is axially displaced from rack A a distance equal to one-fourth of the index distance, the displacement being illustrated as toward the right-hand end of the stop bar, which is its abutment end, but which could be in the opposite direction if desired. Similarly, rack C is displaced from rack B, and rack D is displaced from rack C, by the same increment. Rack D is therefore displaced three-fourths of the index distance from rack A.

The latch 39 may be a separate element, dissociated from the device when not in latching position, but it is preferred to associate it with the device in the following manner. The slots 19 open into a longitudinal groove 41 extending from end to end of the block in its upper wall and adjacent its rear side. This groove is somewhat more than half round in cross section. The latch comprises a latch bar 43 of generally rectangular section adapted to fit closely within the slots 19 and any of the notches in the racks on the stop bar 5. This latch bar has a head 45 at one end which is rotatable and longitudinally slidable in the groove 41. The latch bar has a knob 47 at its other end. The length of the latch bar from the head to the knob is somewhat greater than the length of the slots 19 so that it may pivot downward to drop into any slot and any notch which is in register with the slot.

The stop bar 5 has a longitudinal bore 51. A split micrometer screw 53 having a knurled head 55 is adjustably threaded into one end of this bore. The screw head 55 constitutes the abutment of the positioning device for engagement by the lathe tool carriage or other member which is to be stopped in a selected position. A knurled collar 57 is rotatable on an unthreaded portion 59 of the screw between the end of the stop bar and the screw head. This collar has a tapered ring flange 61 fitting over the end of the stop bar. The flange is graduated, as indicated at 63, to indicate the distance through which the screw 53 travels relative to the stop bar when it is threaded in or out of the bar, this indication being by reference to an index mark 65 on the stop bar. A friction ring 67 is interposed between the portion 59 of the screw and the collar 57 so that the collar rotates with the screw when the latter is turned, but may be rotated relative to the screw for zero-reference-setting purposes.

A lock for the micrometer screw 53 is desirable. As herein illustrated, this lock comprises an elongate rod 69 having a knurled head 71 at one end and having threads 73 adjacent the head. The rod is threaded into the bore 51 of the stop bar until its other end 75 engages the end of the micrometer screw. This jams the micrometer screw sufficiently to prevent it from being inadvertently turned. The threads 73 of the rod 69 extend out of the bore 51 and have a knurled lock nut 77 threaded thereon engaging the end of the stop bar to lock the rod 69 in its locking position.

The drawings illustrate a practical embodiment of the invention wherein the pitch of the slots 19 is greater than the pitch of the notches in any one of the rows A, B, C and D by a selected index distance of $1/16$ inch. The successive rows are longitudinally staggered by an increment of $1/64$ inch. The drawings illustrate the latch 39 as engaged in the central one of the slots 19 and in a notch 21 of the row or rack A, the stop bar being in such angular position that the rack A is aligned with the row of slots 19. It will be seen that the teeth 31 of the rack A extend into the slots 19 other than the slot designated S: Slot S is the one in which the latch is engaged. These extensions are for proportionately increasing distances, depending upon the distance of a particular slot from the slot S. Thus, as to the two slots on opposite sides of slot S, teeth 31 project into these slots for a distance of $1/16$ inch, the index distance. As to the next two slots, teeth 31 project into these slots $2/16$ inch, etc.

Assuming that it is desired to index the stop bar $1/16$ inch to the left, the operator lifts the latch 39 from the slot S, slides it longitudinally to the left a distance corresponding to the pitch of the slots 19, and drops it partially into the first slot 19 to the left of slot S. The latch is temporarily blocked from dropping completely into this notch 21 of rack A by the tooth 31 of the rack projecting into the slot a distance of $1/16$ inch. The operator then slides the stop bar 5 to the left until the latch drops completely into the notch. This occurs upon movement of the stop bar through the desired $1/16$ inch offset. The stop bar is thereupon latched in the desired accurately indexed position.

Assuming that it is desired to index the stop bar $1/8$ inch to the left of its position illustrated in the drawings, the operator lifts the latch 39 from the slot S, slides it longitudinally to the left a distance corresponding to two of the slots 19, and drops it partially into the second slot 19 to the left of slot S. The latch is blocked from completely dropping into a notch 21 of rack A by the tooth 31 of the rack projecting into the slot a distance of $1/8$ inch. The operator then slides the stop bar 5 to the left until the latch drops into a notch. This occurs upon movement of the stop bar through $1/8$ inch, and the stop bar is thereupon latched in the desired indexed position.

The above procedure may be carried out for as great an offset as may be desirable within the range of the device.

Assuming that it is desired to index the stop bar $1/64$ inch to the left of its position illustrated in the drawings, the operator rotates the stop bar through 90° to align the rack B with the row of slots 19. This pushes the latch 39 upward but not sufficiently far to push it entirely out of slot S. The latch is retained in semi-raised position by a tooth 33 of rack B projecting into slot S for a distance of $1/64$ inch, the distance which rack B is offset from rack A. The operator then moves the stop bar 5 to the left until the latch drops into a notch 23 of rack B. This occurs upon movement of the bar through $1/64$ inch, and the stop bar is thereupon latched in the desired indexed position.

The above-described adjustments are, of course, only a few of the many indexing adjustments possible with the device. It will be apparent that the stop bar may be indexed to the right or left through many other distances, corresponding to whole multiples or the stated fractions of the selected index distance of 1/16 inch, as desired. Also initial reference anchoring of the stop bar may be effected by initially placing the latch 39 in one of the slots 19 at the ends of block 1 and then proceeding with the axial adjustments. This doubles the adjustment range in a given direction. In fact adjustments may be started from a reference anchor position of the latch in any slot. Likewise any notch of the stop bar may be started with, depending upon the range of adjustments required. The range may also be increased by increasing the lengths of the stop bar and the block.

The micrometer screw 53 may be threaded into or out of bore 51 in the stop bar (after loosening the locking rod 69) for making fine adjustments of the position of the end face of the screw head 55. The extent of such fine adjustments may be determined by preliminarily rotating the collar 57 relative to the screw to align the zero mark of the graduations 63 with the index mark 65. Then upon turning the screw, the collar rotates with the screw as a micrometer dial to indicate the axial distance through which the screw has travelled.

It will be understood that the device may be constructed to provide for any desired index distance. This is determined simply by the difference in pitches of the slots 19 and the notches of the racks. Within practical limits, as many racks as desired may be provided on the stop bar for adjustments through increments corresponding to fractions smaller than one-fourth of the index distance. The invention may also be carried out in the decimal system instead of the described English system, as will be obvious from the above disclosure.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A quick-adjustable positioning device comprising a fixed reference member having a row of apertures spaced at equal intervals, a positioning member mounted for movement relative to the reference member in the direction of the row of apertures, said positioning member having a row of recesses aligned with the row of apertures and spaced at equal intervals but with a pitch differing from the pitch of the apertures by a desired index distance, said positioning member being movable in said direction with respect to the reference member for aligning a recess with an aperture to receive a latch for releasably latching the positioning member to the reference member.

2. A quick-adjustable positioning device comprising a fixed, elongate guide having a row of apertures spaced at equal intervals along its length, a stop bar longitudinally slidable in the guide, said bar having a row of recesses aligned with the row of apertures and spaced at equal intervals but with a pitch differing from the pitch of the apertures by a desired index distance, said stop bar being slidable in the guide for aligning a recess with an aperture to receive a latch for releasably latching the stop bar to the guide.

3. A quick-adjustable positioning device comprising a fixed, elongate guide having a row of transversely extending slots spaced at equal intervals along its length, a stop bar longitudinally slidable in the guide, said bar having a notched rack thereon aligned with the row of slots, the width of the notches of the rack being substantially equal to the width of the slots, the pitch of the slots being greater than the pitch of the notches by an amount equal to a desired index distance.

4. A quick-adjustable positioning device comprising a fixed, elongate guide having a row of transversely extending slots spaced at equal intervals along its length, a stop bar longitudinally slidable in the guide, said bar having a notched rack thereon aligned with the row of slots, the width of the notches of the rack being substantially equal to the width of the slots, the pitch of the slots being greater than the pitch of the notches by an amount equal to a desired index distance, and a latch engageable in a pair of registering slots and notches, said latch being mounted for pivotal and longitudinal movement on the guide.

5. A quick-adjustable positioning device comprising a fixed reference member having a row of apertures spaced at equal intervals, a positioning member mounted for movement relative to the reference member in the direction of the row of apertures and also for rotation relative to the reference member, said positioning member having a plurality of rows of recesses spaced around its periphery successively alignable with the row of apertures upon rotation of the positioning member, the recesses of each row being spaced at equal intervals but with a pitch differing from the pitch of the aperatures by a desired index distance, the recesses in successive rows being successively staggered in the direction of the rows by increments corresponding to a fraction of said index distance.

6. A quick-adjustable positioning device comprising a fixed, elongate guide having a row of apertures spaced at equal intervals along its length, a stop bar rotatable and longitudinally slidable in the guide, said bar having a plurality of longitudinal rows of recesses spaced around its periphery successively alignable with the row of apertures upon rotation of the stop bar in the guide, the recesses of each row being spaced at equal intervals but with a pitch differing from the pitch of the apertures by a desired index distance, the recesses in successive rows being successively longitudinally staggered by increments corresponding to a fraction of said index distance.

7. A quick-adjustable positioning device comprising a fixed, elongate guide having a row of transversely extending slots spaced at equal intervals along its length, a stop bar rotatable and longitudinally slidable in the guide block, said bar having a plurality of racks of equal pitch spaced around its periphery successively alignable with the row of slots upon rotation of the stop bar in the guide, the pitch of the slots being greater than the pitches of the racks by an amount equal to a desired index distance, the width of the notches between the teeth of the racks being substantially equal to the width of the slots, successive racks being longitudinally staggered on the bar by increments corresponding to a fraction of said index distance.

8. A quick-adjustable positioning device comprising a fixed, elongate guide having a row of transversely extending slots spaced at equal intervals along its length, a stop bar rotatable and longitudinally slidable in the guide block, said bar having a plurality of racks of equal pitch spaced around its periphery successively alignable with the row of slots upon rotation of the stop bar in the guide, the pitch of the slots being greater than the pitches of the racks by an amount equal to a desired index distance, the width of the notches between the teeth of the racks being substantially equal to the width of the slots, successive racks being longitudinally staggered on the bar by increments corresponding to a fraction of said index distance, and a latch engageable in a pair of registering slots and notches, said latch being mounted for pivotal and longitudinal movement on the guide.

9. A quick-adjustable positioning device comprising an elongate guide block provided with a clamp for clamping it on a machine tool, said block having a longitudinal bearing aperture therethrough and a longitudinal row of transverse slots spaced at equal intervals along its length forming apertures through the block leading into said bearing aperture, an elongate stop bar longitudinally slidable in said bearing aperture, said bar having a longitudinal row of notches aligned with the row of slots and spaced at equal intervals but with a pitch differing from the pitch of the slots by a desired index distance, and a latch mounted for pivotal and longitudinal movement on the guide block so as to be engageable in any one of said slots and in any one of the notches which is in register with the slot in which the latch is engaged.

10. A quick-adjustable positioning device comprising an elongate guide block provided with a clamp for clamping it on a machine tool, said block having a longitudinal cylindrical bearing aperture therethrough and a longitudinal row of transverse slots spaced at equal intervals along its length forming apertures through the block leading into said bearing aperture, an elongate cylindrical stop bar rotatable and longitudinally slidable in the bearing aperture of the guide block, said bar having a plurality of rows of notches spaced around its periphery and successively alignable with the row of slots upon rotation of the bar in the guide, the notches of each row being spaced at equal intervals but with a pitch differing from the pitch of the slots by a desired index distance, the notches in successive rows being successively longitudinally staggered by increments corresponding to a fraction of said index distance, and a latch mounted for pivotal and longitudinal movement on the guide block so as to be engageable in any one of said slots and in any one of the notches which is in register with the slot in which the latch is engaged.

11. A quick-adjustable positioning device comprising an elongate guide block having a longitudinal row of slots spaced at equal intervals in a wall thereof, the slots opening into a longitudinal groove in said wall of the block, a stop bar longitudinally slidable in the guide block, said bar having a row of notches aligned with the row of slots and spaced at equal intervals but with a pitch differing from the pitch of the slots by a desired index distance, and a latch engageable in a pair of registering slots and notches, said latch having a head retained in said groove for pivotal and longitudinal sliding movement.

12. A quick-adjustable positioning device comprising a fixed, elongate guide having a row of apertures spaced at equal intervals along its length, a stop bar longitudinally slidable in the guide, said bar having a row of recesses aligned with the row of apertures and spaced at equal intervals but with a pitch differing from the pitch of the apertures by a desired index distance, said stop bar being slidable in the guide for aligning a recess with an aperture to receive a latch for releasably latching the stop bar to the guide, and a micrometer screw adjustably threaded in one end of the stop bar, said screw having a head for adjustment and for engagement by an object to be positioned.

13. A quick-adjustable positioning device as set forth in claim 12, further including a micrometer dial frictionally rotatable on the micrometer screw between its head and said end of the stop bar, said dial having graduations thereon cooperable with an index mark on said bar.

14. A quick-adjustable positioning device as set forth in claim 12, further including a lock rod for the micrometer screw threaded into the other end of the stop bar and extending through the bar into engagement with the end of the screw.

FRANK J. EISELE.

REFERENCES CITED

The following references are of record in the file of this patent:

UNITED STATES PATENTS

| Number | Name | Date |
|---|---|---|
| 1,480,522 | Ferguson | Jan. 8, 1924 |
| 1,582,077 | Palmer | Apr. 27, 1926 |
| 1,649,695 | Higgins | Nov. 15, 1927 |
| 1,686,743 | Dull | Oct. 9, 1928 |
| 2,340,953 | Gardner | Feb. 8, 1944 |